United States Patent
Matsuda et al.

(10) Patent No.: US 8,093,317 B2
(45) Date of Patent: Jan. 10, 2012

(54) ANTISTATIC THERMOPLASTIC RESIN COMPOSITION AND MOLDED ARTICLE COMPOSED THEREOF

(75) Inventors: Masashi Matsuda, Chiba (JP); Akira Saito, Chiba (JP); Hisashi Yamanoue, Chiba (JP)

(73) Assignee: Toray Industries, Inc. (JP)

( * ) Notice: Subject to any disclaimer, the term of this patent is extended or adjusted under 35 U.S.C. 154(b) by 696 days.

(21) Appl. No.: 12/278,603

(22) PCT Filed: Feb. 6, 2007

(86) PCT No.: PCT/JP2007/051962
§ 371 (c)(1),
(2), (4) Date: Aug. 7, 2008

(87) PCT Pub. No.: WO2007/094195
PCT Pub. Date: Aug. 23, 2007

(65) Prior Publication Data
US 2009/0030122 A1   Jan. 29, 2009

(30) Foreign Application Priority Data

Feb. 13, 2006   (JP) ................................ 2006-035222
Jul. 3, 2006    (JP) ................................ 2006-183527
Sep. 5, 2006    (JP) ................................ 2006-240519

(51) Int. Cl.
*C08K 5/3435*   (2006.01)
*C08K 5/3445*   (2006.01)

(52) U.S. Cl. .............................. 524/99; 524/106; 524/154
(58) Field of Classification Search .................... 524/99, 524/106, 154
See application file for complete search history.

(56) References Cited

U.S. PATENT DOCUMENTS

| | | | |
|---|---|---|---|
| 5,965,206 A | 10/1999 | Hilti et al. | |
| 6,914,092 B1 * | 7/2005 | Dobler et al. | 524/157 |
| 2002/0137825 A1 | 9/2002 | Lamanna et al. | |
| 2003/0211320 A1 | 11/2003 | Thompson et al. | |
| 2004/0167265 A1 | 8/2004 | Thompson et al. | |
| 2005/0049360 A1 * | 3/2005 | Okamoto | 525/88 |

FOREIGN PATENT DOCUMENTS

| | | |
|---|---|---|
| EP | 0 759 459 A2 | 2/1997 |
| EP | 0 829 520 A1 | 3/1998 |
| EP | 1 242 670 B1 | 9/2002 |
| JP | 60-23435 A | 2/1985 |
| JP | 63-95251 A | 4/1988 |
| JP | 63-97653 A | 4/1988 |
| JP | 3-255161 A | 11/1991 |
| JP | 10-265673 A | 10/1998 |
| JP | 30-265673 A | 10/1998 |
| JP | 2003-507510 T | 2/2003 |
| JP | 2003-511505 T | 3/2003 |
| JP | 2003-519281 T | 6/2003 |
| JP | 2005-097598 | 4/2005 |
| JP | 2005-290152 A | 10/2005 |
| JP | 2006-233204 | 9/2006 |
| JP | 2007-070421 | 3/2007 |
| WO | 01/25326 A1 | 4/2001 |
| WO | 03/074607 A1 | 9/2003 |

OTHER PUBLICATIONS

E. Schmidt et al. "Determination of Latex Particle Size Distributions by Fractional Creaming with Sodium Alginate," Rubber Age, vol. 88, Dec. 1960, pp. 484-490.

* cited by examiner

*Primary Examiner* — Robert D. Harlan
(74) *Attorney, Agent, or Firm* — DLA Piper LLP (US)

(57) ABSTRACT

An antistatic thermoplastic resin composition includes 0.01 to 20 parts by weight of an organic ion conductive agent mixed with 100 parts by weight of a thermoplastic resin composition consisting of 97 to 55 parts by weight of a styrene-based resin and 3 to 45 parts by weight of a copolymer containing alkylene oxide units as a component, and a molded article composed thereof. The antistatic thermoplastic resin composition is low in surface resistivity value, stable in sustained antistatic properly and excellent in moldability, surface appearance and mechanical properties, and can be suitably used as molded articles such as electric and electronic parts, carrier parts for electric and electronic parts, carrier parts for display related parts, etc.

13 Claims, No Drawings

ANTISTATIC THERMOPLASTIC RESIN COMPOSITION AND MOLDED ARTICLE COMPOSED THEREOF

RELATED APPLICATIONS

This is a §371 of International Application No. PCT/JP2007/051962, with an international filing date of Jun. 6, 2007 (WO 2007/094195 A1, published Aug. 23, 2007), which is based on Japanese Patent Application Nos. 2006-035222, filed Jun. 13, 2006, 2006-183527, filed Jul. 3, 2006, and 2006-240519, filed Sep. 5, 2006.

TECHNICAL FIELD

This disclosure relates to an antistatic thermoplastic resin composition obtained by mixing a copolymer containing alkylene oxide units as a component and an organic ion conductive agent with a styrene-based resin, and a molded article composed of the antistatic thermoplastic resin composition.

BACKGROUND

In recent years, molded thermoplastic resin articles are used in a wide range of areas, including the parts of household electric appliances, OA apparatuses, motor vehicles, etc. However, the thermoplastic resins constituting the molded thermoplastic resin articles are mostly electrically insulating, and have a problem that the malfunctions of controllers are caused due to the electrostatic charges generated in the various apparatuses equipped with precise electric and electronic control devices. As methods for solving the problem caused by these electrostatic charges, methods of mixing an amine-based antistatic agent with a thermoplastic resin are disclosed. Further, as methods for keeping a thermoplastic resin continuously antistatic, methods of mixing a polyamide elastomer such as a polyether-ester amide are disclosed. However, the thermoplastic resins made to have antistatic performance by these methods are not sufficiently antistatic, depending on applications, and do not exhibit the required performance satisfactorily as the case may be.

As further other methods for making a thermoplastic resin antistatic, methods of mixing carbon black as a conductive filler with a thermoplastic resin are known. However, a thermoplastic resin containing carbon black has a problem that the color of the molded thermoplastic resin article is limited to black and a problem that, since it is necessary to mix a relatively large amount of carbon black for obtaining a stable resistance value in the electrostatically charged region, the mechanical properties of the molded thermoplastic resin article decline.

As still further other methods for making a thermoplastic resin antistatic, proposed are methods of mixing carbon fibers, metal fibers or metal powder as a conductive filler with a thermoplastic resin. However, the molded thermoplastic resin articles obtained by these methods have such problems that the appearance of the products is poor and that the mechanical properties decline.

Methods recently proposed to solve the problems of the thermoplastic resins made antistatic by these conventional methods include a method of mixing an ionic salt obtained from nonpolymeric nitrogen onium cation and weakly coordinating fluoroorganic anion with a thermoplastic resin (JP 2003-511505 T2), a method of mixing a perfluoroalkylsulfonate (JP 2003-507510 T2), and a method of combining an onium salt of a cyclic amidine or pyridine with a polymeric compound (JP 10-265673 A), etc. However, these proposals do not satisfactorily provide the high antistatic property required especially in the area of electronic and electric apparatus parts, etc. Further, there is no particularly disclosed application to a styrene-based thermoplastic resin, and the applicability to the styrene-based resin is unknown.

SUMMARY

We provide antistatic thermoplastic resin compositions comprising 0.01 to 20 parts by weight of an organic ion conductive agent mixed with 100 parts by weight of a thermoplastic resin composition consisting of 97 to 55 parts by weight of a styrene-based resin and 3 to 45 parts by weight of a copolymer containing alkylene oxide units as a component.

Further, we provide molded articles composed of the antistatic thermoplastic resin composition.

DETAILED DESCRIPTION

The antistatic thermoplastic resin composition is an antistatic thermoplastic resin composition comprising 0.01 to 20 parts by weight of an organic ion conductive agent mixed with 100 parts by weight of a thermoplastic resin composition consisting of 97 to 55 parts by weight of a styrene-based resin and 3 to 45 parts by weight of a copolymer containing alkylene oxide units as a component.

The styrene-based resin is a polymer containing an aromatic vinyl monomer as a component of it. Examples of the aromatic vinyl monomer include styrene, o-methylstyrene, p-methylstyrene, vinyltoluene, t-butylstyrene, o-ethylstyrene, o-chlorostyrene, o,p-dichlorostyrene, etc. Among them, styrene or α-methylstyrene is preferred. One of the aromatic vinyl monomers can be used alone, or two or more of them can also be used together.

Further, the styrene-based resin can also be a vinyl-based copolymer obtained by copolymerizing an aromatic vinyl monomer and another vinyl monomer copolymerizable with the aromatic vinyl monomer for the purpose of acquiring such properties as chemicals resistance and heat resistance. Examples of the vinyl monomer include acrylonitrile, methacrylonitrile, ethacrylonitrile, (meth)acrylic acid, methyl (meth)acrylate, ethyl (meth)acrylate, n-propyl (meth)acrylate, n-butyl (meth)acrylate, t-butyl (meth)acrylate, n-hexyl (meth)acrylate, glycidyl (meth)acrylate, allyl glycidyl ether, styrene-p-glycidyl ether, p-glycidylstyrene, 2-hydroxyethyl (meth)acrylate, 3-hydroxypropyl (meth)acrylate, 2,3,4,5,6-pentahydroxyhexyl (meth)acrylate, 2,3,4,5-tetrahydroxypentyl acrylate, maleic acid, maleic anhydride, maleic acid monoethyl ester, itaconic acid, itaconic anhydride, phthalic acid, N-methylmaleimide, N-ethylmaleimide, N-cyclohexylmaleimide, N-phenylmaleimide, acrylamide, methacrylamide, N-methylacrylamide, butoxyymethylacrylamide, N-propylmethacrylamide, aminoethyl acrylate, propylaminoethyl acrylate, dimethylaminoethyl methacrylate, ethylaminopropyl methacrylate, phenylaminoethyl methacrylate, cyclohexylaminoethyl methacrylate, N-vinyldiethylamine, N-acetylvinylamine, allylamine, methallylamine, N-methylallylamine, p-aminostyrene, 2-isopropenyl-oxazoline, 2-vinyl-oxazoline, 2-acroyl-oxazoline, 2-styryl-oxazoline, etc. Among them, especially acrylonitrile or methyl methacrylate can be preferably used.

It is preferred in view of moldability that the rate of the aromatic vinyl monomer contained in the styrene-based resin is 10 to 100 parts by weight. A more preferred range is 20 to 90 parts by weight.

It is preferred for maintaining the balance of physical properties that the weight average molecular weight of the styrene-based resin as polystyrene is 50,000 to 300,000. The weight average molecular weight can be determined by a generally publicly known method using gel permeation chromatography (GPC).

The method for producing the styrene-based resin is not especially limited, and an ordinary production method such as bulk polymerization method, suspension polymerization method, emulsion polymerization method or bulk-suspension polymerization method can be used. Further, one styrene-based resin obtained by any of these methods can be used alone or two or more styrene-based resins produced can also be melt-kneaded for use as a styrene-based resin.

For the purpose of dramatically enhancing such a property as impact resistance of the styrene-based resin, it is preferred to use a rubber-modified styrene-based resin in which a rubbery polymer is dispersed in the matrix of an aromatic vinyl-based (co)polymer. That is, as the styrene-based resin, preferably can be used a rubber-modified styrene-based resin containing a graft copolymer obtained by graft-polymerizing an aromatic vinyl monomer and another vinyl monomer (co)polymerizable with the aromatic vinyl monomer to a rubbery polymer. Further, also preferably can be used a rubber-modified styrene-based resin containing a vinyl-based copolymer obtained by copolymerizing an aromatic vinyl monomer and another vinyl monomer copolymerizable the aromatic vinyl monomer and a graft copolymer obtained by graft-polymerizing an aromatic vinyl monomer and another vinyl monomer copolymerizable with the aromatic vinyl monomer to a rubbery polymer.

Examples of the rubbery polymer include diene-based rubbers such as polybutadiene, styrene-butadiene copolymer, acrylonitrile-butadiene copolymer, styrene-butadiene block copolymer, and butyl acrylate-butadiene copolymer, acrylic rubbers such as polybutyl acrylate, polyisoprene, ethylene-propylene-diene ternary copolymer, etc. Among them, polybutadiene or butadiene copolymer can be preferably used.

In view of excellent impact resistance, it is preferred that the average rubber particle size of the rubbery polymer is in a range from 0.15 to 0.60 µm. A more preferred average rubber particle size range is 0.2 to 0.55 µm. Above all, especially preferred is a rubbery polymer in which the ratio of the weight of the rubber particles with their average particle size kept in a range from 0.20 to 0.25 µm to the weight of the rubber particles with their average particle size kept in a range from 0.50 to 0.65 µm is 90:10 to 60:40, since the rubbery polymer is very excellent in impact resistance and also in drop hammer impact resistance as a molded thin-walled article.

In this case, the weight average particle size of rubber particles can be determined by the method of obtaining the particle size corresponding to a cumulative weight percentage of 50% from the cumulative weight percentage of sodium alginate concentration, described in "Rubber Age, Vol. 88, pages 484-490, (1960), by E. Schmidt, P. H. Biddison."

In the case where the rubber-modified styrene-based resin is used as the styrene-based resin, since the rubbery polymer and the styrene-based resin as the matrix are incompatible with each other, grafting a component compatible with the matrix to the rubbery polymer allows the impact resistance to be enhanced further. That is, it is preferred to use a graft copolymer obtained by graft-polymerizing an aromatic vinyl monomer or monomer mixture to the rubbery polymer. As the monomer used for graft polymerization, it is preferred to use the same monomer component as the monomer component of the aromatic vinyl-based (co)polymer used as the matrix at the same rate. The chemical composition and the grafted amount are not especially limited, but it is preferred to adjust to the chemical composition and the grafted amount which do not impair the dispersibility of the rubbery polymer. It is preferred that the grafting rate is 5 to 200%. A more preferred range is 20 to 100%. The grafting rate in this case refers to the value calculated from the following Formula 1:

Grafting rate(%)=(Amount of vinyl-based copolymer graft-polymerized to rubbery polymer)/(Rubber content of graft copolymer)×100.

With regard to the properties of the (co)polymer not grafted, in view of obtaining a resin composition with excellent impact resistance, it is preferred that the intrinsic viscosity [η] of the methyl ethyl ketone-soluble matter (measured at 30° C.) is in a range from 0.25 to 0.60 dl/g. A more preferred range is 0.25 to 0.50 dl/g.

As the method for producing the rubber-modified styrene-based resin, industrially and economically suitable is a method of producing a rubber-modified styrene-based resin by melt-kneading a graft copolymer obtained by graft-polymerizing an aromatic vinyl monomer or a monomer mixture containing the aromatic vinyl monomer to a rubbery polymer and a styrene-based (co)polymer obtained by polymerizing an aromatic vinyl monomer or a monomer mixture containing the aromatic vinyl monomer.

The graft copolymer contained in the rubber-modified styrene-based resin can be obtained by a publicly known polymerization method such as emulsion polymerization or bulk polymerization. Above all, an emulsion polymerization method in which a monomer or monomer mixture and a mixture consisting of a radical generating agent and a chain transfer agent are continuously supplied into a polymerization vessel in the presence of a rubbery polymer latex is suitable in view of operation.

Examples of the styrene-based resin include polystyrene, high impact polystyrene, AS resin, AAS resin, AES resin, ABS resin, MAS resin, MS resin, MABS resin, MBS resin, etc., alloys consisting of any of these resins and another resin, etc.

The copolymer containing alkylene oxide units as a component is, for example, a poly(alkylene oxide) glycol or a diol compound having an alkylene oxide added and is a copolymer in which any of them is, for example, block-bonded or graft-bonded. It is preferred that the copolymer is a polyether-ester amide (also called a polyamide elastomer) or polyether-ester.

It is preferred that the copolymer containing alkylene oxide units as a component is a copolymer containing one or more diol compounds selected from the group consisting of poly(alkylene oxide) glycols and the following general Formulae (I) through (III) as a component(s):

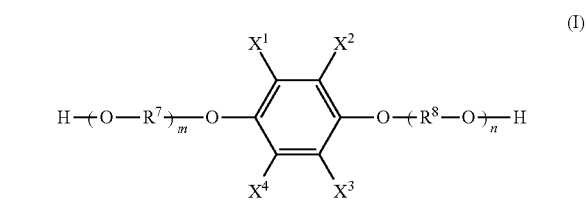

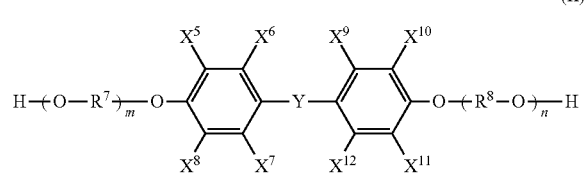

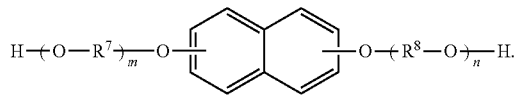

(III)

In the general Formulae (I) through (III), $R^7$ and $R^8$ denote, respectively independently, an ethylene group or propylene group; Y denotes a covalent bond, alkylene group with 1 to 6 carbon atoms, alkylidene group with 2 to 6 carbon atoms, cycloalkylidene group with 7 to 17 carbon atoms, arylalkylidene group with 7 to 17 carbon atoms, O, SO, $SO_2$, CO, S, $CF_2$, $C(CF_3)_2$ or NH; and $X^1$ to $X^{12}$ denote, respectively independently, a hydrogen atom, alkyl group with 1 to 6 carbon atoms, halogen, $SO_3H$ or any of its metal salts ($SO_3Na$, $SO_3K$, etc.).

In the general Formulae (I) through (III), m and n respectively denote the polymerization degree of "—($R^7O$)—" or "—($R^8O$)—." Their sum (m+n) depends on the selected one of the diol compounds represented by the general Formulae (I) through (III), but it is preferred that the sum is in a range from 8 to 65. The mean value of (m+n) can be obtained by calculation from the structure (the molecular weight of the monomer) and the number average molecular weight of the selected one of the diol compounds represented by the general Formulae (I) through (III).

The number average molecular weight can be calculated from the following Formula 2, where G is the amount (mg) of the potassium hydroxide necessary for neutralizing the acetylation product produced by heating 1 g of a sample together with an excessive amount of an acetylating agent, for example, acetic anhydride for acetylation, and H is the amount (mg) of the potassium hydroxide necessary for neutralizing 1 g of the sample not yet acetylated:

Number average molecular weight=11200/({G/(1−0.00075×G)}−H).

As the poly(alkylene oxide) glycol, preferably can be used polyethylene oxide glycol, poly(1,2-propylene oxide) glycol, poly(1,3-propylene oxide) glycol, poly(tetramethylene oxide) glycol, poly(hexamethylene oxide) glycol, block or random copolymer consisting of ethylene oxide and propylene oxide, or block or random copolymer consisting of ethylene oxide and tetrahydrofuran, etc. Among them, polyethylene oxide glycol is more preferred. It is preferred that the number average molecular weight of the poly(alkylene oxide) glycol is in a range from 200 to 6,000, and an especially preferred range is 300 to 4,000. Further, as required, both the ends of the poly(alkylene oxide) glycol may also be aminated or carboxylated.

As the diol compound selected from the group consisting of the general Formulae (I) through (III), preferred are diol compounds, in which $R^7$ and $R^8$ denote, respectively independently, an ethylene group or propylene group; Y denotes an alkylene group with 1 to 6 carbon atoms; and $X^1$ to $X^{12}$ denote, respectively independently, a hydrogen atom or alkyl group with 1 to 6 carbon atoms. Among them, diol compounds, in which $X^1$ and $X^{12}$ denote respectively a hydrogen atom, are especially preferred.

Particular diol compounds include ethylene oxide and/or propylene oxide addition products of bisphenol A, tetrabromobisphenol A, dimethylbisphenol A, teramethylbisphenol A, 2,2-bis(sodium 4,4'-hydroxyphenyl-3,3'-sulfonate)propane, bisphenol S, dimethylbisphenol S, teramethylbisphenol S, 4,4'-(hydroxy)biphenyl, bis(4-hydroxyphenyl) sulfide, bis(4-hydroxyphenyl) sulfoxide, bis(4-hydroxyphenyl)methane, bis(4-hydroxyphenyl)difluoromethane, bis(4-hydroxyphenyl)hexafluoropropane, bis(4-hydroxyphenyl)ether, bis(4-hydroxyphenyl)amine, 2,2-bis(4-hydroxyphenyl)ethane, 1,1-bis(4-hydroxyphenyl)cyclohexane, 4,4'-dihydroxybenzophenone, hydroquinone, sodium 1,4-dihydroxybenzenesulfonate, dihydroxynaphthalene, etc., their block copolymers, etc. Among them, especially preferred diol compounds include the ethylene oxide addition product of hydroquinone, ethylene oxide addition product of bisphenol A, ethylene oxide addition product of bisphenol S, ethylene oxide addition product of dihydroxynaphthalene, and their block copolymers. Especially the ethylene oxide addition product of bisphenol A and its block copolymers are preferred in view of polymerizability and economy.

It is preferred that the number average molecular weight of the diol compound selected from the group consisting of the general Formulae (I) through (III) is 1,000 to 3,000. In the case where the number average molecular weight is in this range, the polyether-ester amide obtained has a higher antistatic property and the polymerization time can be shortened.

As the copolymer containing alkylene oxide units as a component, preferably used is a polyether-ester amide (polyamide elastomer) or polyether-ester containing one or more diol compounds selected from the group consisting of the poly(alkylene oxide) glycols and the general Formulae (I) through (III) as a component(s).

As the polyether-ester amide, preferred is a graft or block copolymer containing an aminocarboxylic acid with 6 or more carbon atoms, lactam with 6 or more carbon atoms or the reaction product obtained from a diamine with 6 or more carbon atoms and a dicarboxylic acid with 6 or more carbon atoms, and a diol compound selected from the group consisting of the poly(alkylene oxide) glycols and the general Formulae (I) through (III) as components.

As the aminocarboxylic acid with 6 or more carbon atoms constituting the polyether-ester amide, preferred is an aminocarboxylic acid with 6 to 20 carbon atoms. Examples of it include aminocarboxylic acids such as $\overline{\omega}$-aminocaproic acid, $\overline{\omega}$-aminoenanthic acid, $\overline{\omega}$-aminocaprylic acid, $\overline{\omega}$-aminopergonic acid, $\overline{\omega}$aminocapric acid, 11-aminoundecanoic acid and 12-aminododecanoic acid. Further, as the lactam with 6 or more carbon atoms, preferred is a lactam with 6 to 20 carbon atoms. Examples of it include ε-caprolactam, enatholactam, capryllactam, laurolactam, etc. Furthermore, as the reaction product obtained from a diamine with 6 or more carbon atoms and a dicarboxylic acid with 6 or more carbon atoms, preferred is a reaction product obtained from a diamine with 6 to 20 carbon atoms and a dicarboxylic acid with 6 to 20 carbon atoms. Examples of it include salts (nylon salts) obtained from a diamine and a dicarboxylic acid as reaction products such as a salt obtained from hexamethylenediamine and adipic acid, salt obtained from hexamethylenediamine and sebacic acid and hexamethylenediamine and isophthalic acid.

In the polyether-ester amide, it is preferred that the bond between the aminocarboxylic acid with 6 or more carbon atoms, the lactam with 6 or more carbon atoms, or the reaction product obtained from a diamine with 6 or more carbon atoms and a dicarboxylic acid with 6 or more carbon atoms on one hand and the diol compound on the other hand is an ester bond or amide bond.

Further, the polyether-ester amide may further contain a third component such as a dicarboxylic acid or diamine as a reaction component. In this case, the dicarboxylic acid preferred as a component is a carboxylic acid with 4 to 20 carbon atoms. Examples of it preferred in view of polymerizability, color tone and physical properties include aromatic dicarboxylic acids such as terephthalic acid, isophthalic acid, phthalic acid, naphthalene-2,7-dicarboxylic acid, diphenyl-4,4-dicarboxylic acid, diphenoxyethanedicarboxylic acid and sodium 3-sulfoisophthalate, alicyclic dicarboxylic acids such as 1,4-cyclohexanedicarboxylic acid, 1,2-cyclohexanedicarboxylic acid and dicyclohexyl-4,4-dicarboxylic acid, aliphatic dicarboxylic acids such as succinic acid, oxalic acid, adipic acid, sebacic acid and 1,10-decanedicarboxylic acid. On the other hand, examples of the diamine as a component include aromatic, alicyclic and aliphatic diamines. Among them, hexamethylenediamine as an aliphatic diamine is preferred.

As the polyether-ester, preferably used is a copolymer containing a glycol with 2 to 8 carbon atoms and a polycarboxylic acid with 4 to 20 carbon atoms and/or a polycarboxylic acid ester, and a diol compound selected from the group consisting of the poly(alkylene oxide) glycols and the general Formulae (I) through (III), and obtained by polycondensing them.

As the glycol with 2 to 8 carbon atoms constituting the polyether-ester, can be used ethylene glycol, propylene glycol, 1,4-butanediol, 1,3-butanediol, 1,4-cyclohexanedimethanol, 1,4-cyclohexanediol, etc. Among them, ethylene glycol, propylene glycol and 1,4-butanediol can be preferably used. Further as examples of the polycarboxylic acid with 4 to 20 carbon atoms, enumerated are aromatic dicarboxylic acids such as terephthalic acid, isophthalic acid, phthalic acid, naphthalene-2,7-dicarboxylic acid, diphenyl-4,4-dicarboxylic acid, diphenoxyethanedicarboxylic acid and 3-sulfoisophthalic acid, alicyclic dicarboxylic acids such as 1,4-cyclohexanedicarboxylic acid, 1,2-cyclohexanedicarboxylic acid and dicyclohexyl-4,4-dicarboxylic acid, aliphatic dicarboxylic acids such as succinic acid, oxalic acid, adipic acid, sebacic acid and 1,10-decanedicarboxylic acid. Among these polycarboxylic acids, in view of polymerizability, color tone and physical properties, terephthalic acid and isophthalic acid are preferred. Further, the polycarboxylic acid ester is a product obtained by partially or entirely esterifying the polycarboxylic acid such as a monoester or diester, etc. of any of the polycarboxylic acids. As the polycarboxylic acid ester, monomethyl terephthalate, dimethyl terephthalate, dimethyl isophthalate, dimethyl adipate, etc. can be used. Dimethyl terephthalate and dimethyl isophthalate can be preferably used.

The mixed amount of the copolymer containing alkylene oxide units as a component is 3 to 45 parts by weight, preferably 5 to 40 parts by weight in the thermoplastic resin. In the case where the mixed amount of the copolymer containing alkylene oxide units as a component is less than 3 parts by weight, that is, in the case where the mixed amount of the styrene-based resin is more than 97 parts by weight, the antistatic property of the thermoplastic resin declines. Further, if the mixed amount of the copolymer containing alkylene oxide units as a component is more than 45 parts by weight, that is, in the case where the mixed amount of the styrene-based resin is less than 55 parts by weight, the flexural modulus of the thermoplastic resin tends to decline.

The method for producing the copolymer containing alkylene oxide units as a component is not especially limited, and a publicly known production method can be used. For example, in the case of a polyether-ester amide, the following method can be used. A salt obtained from an aminocarboxylic acid, lactam or diamine with 6 or more carbons and a dicarboxylic acid with 6 or more carbon atoms, and a dicarboxylic acid capable of being contained as the third component are made to react with each other, to prepare a polyamide prepolymer with carboxylic acid groups at both the ends, and a diol compound selected from the group consisting of poly (alkylene oxide) glycols and the general Formulae (I) through (III) is made to react with the prepolymer in vacuum. Further, the following method can also be applied. Three compounds, namely, a salt obtained from an aminocarboxylic acid, lactam or diamine with 6 or more carbon atoms and a dicarboxylic acid with 6 or more carbon atoms, a dicarboxylic acid capable of being contained as the third component, and a diol compound selected from the group consisting of poly(alkylene oxide) glycols and the general Formulae (I) through (III) are supplied into a reactor and heated for reaction at high temperature in the presence or absence of water, to produce a polyamide elastomer with carboxylic acid groups at the ends, and subsequently polymerization is performed at atmospheric pressure or under reduced pressure. Furthermore, a method, in which these three compounds are simultaneously supplied into a reactor, to perform melt-polymerization, followed by polymerization all at once in high vacuum, can also be applied. Moreover, in the case of a polyether-ester, a publicly known polyester production method can be used.

The antistatic thermoplastic resin composition can, as required, contain a modified vinyl-based (co)polymer containing at least one type of functional groups selected from carboxyl groups, hydroxyl groups, epoxy groups, amino groups and oxazoline groups (hereinafter may be abbreviated as "modified vinyl-based polymer"). The modified vinyl polymer used can be a polymer obtained by polymerizing or copolymerizing one or more vinyl monomers and a vinyl monomer for introducing the functional groups (at least one type of functional groups selected from carboxyl groups, hydroxyl groups, epoxy groups, amino groups and oxazoline groups). It is preferred that the content of the compound having the functional group in the modified vinyl-based polymer is in a range from 0.01 to 20 wt % per 100 wt % of the modified vinyl-based polymer.

Examples of the vinyl monomer used for producing the modified vinyl-based polymer include aromatic vinyl monomers such as styrene, α-methylstyrene, p-methylstyrene, vinyltoluene, t-butylstyrene, o-ethylstyrene, o-chlorostyrene, and o,p-dichlorostyrene. Further, another vinyl monomer copolymerizable with the aromatic vinyl-based monomer can also be used together. Examples of the other vinyl monomer include acrylonitrile, methacrylonitrile, ethacrylonitrile, (meth)acrylic acid, methyl (meth)acrylate, ethyl (meth)acrylate, n-propyl (meth)acrylate, n-butyl (meth)acrylate, t-butyl (meth)acrylate, n-hexyl (meth)acrylate, glycidyl (meth)acrylate, allyl glycidyl ether, styrene-p-glycidyl ether, p-glycidylstyrene, 2-hydroxyethyl (meth)acrylate, 3-hydroxypropyl (meth)acrylate, 2,3,4,5,6-pentahydroxyhexyl (meth)acrylate, 2,3,4,5-tetrahydroxypentyl acrylate, maleic acid, maleic anhydride, maleic acid monoethyl ester, itaconic acid, itaconic anhydride, phthalic acid, N-methylmaleimide, N-ethylmaleimide, N-cyclohexylmaleimide, N-phenylmaleimide, acrylamide, methacrylamide, N-methylacrylamide, butoxymethylacrylamide, N-propylmethacrylamide, aminoethyl acrylate, propylaminoethyl acrylate, dimethylaminoethyl methacrylate, ethylaminopropyl methacrylate, phenylaminoethyl methacrylate, cyclohexylaminoethyl methacrylate, N-vinyldiethylamine, N-acetylvinylamine, allylamine, methallylamine, N-methylallylamine, p-aminostyrene, 2-isopropenyl-oxazoline, 2-vinyl-oxazoline, 2-acroyl-oxazoline, 2-styryl-oxazoline, etc.

The vinyl monomer used for introducing carboxyl groups as the functional groups into the modified vinyl-based polymer can be a carboxylic acid or carboxylic anhydride having an unsaturated bond such as acrylic acid, methacrylic acid, maleic acid, maleic acid monoethyl ester, maleic anhydride, phthalic acid or itaconic acid. Further, the following method can also be used. Any of the vinyl monomers can also be (co)polymerized with a polymer forming agent having a carboxyl group such as γ,γ'-azobis(γ-cyanovaleric acid), α,α'-azobis(α-cyanoethyl)-p-benzoic acid or succinic acid peroxide and/or a polymerization degree regulator having a carboxyl group such as thioglycolic acid, α-mercaptopropionic acid, β-mercaptopropionic acid, α-mercapto-isobutyric acid, or 2, 3 or 4-mercaptobenzoic acid. Furthermore, a method of saponifying by an alkali, a copolymer consisting of a (meth)acrylic acid ester monomer such as methyl methacrylate or methyl acrylate and an aromatic vinyl monomer, or a copolymer consisting of a (meth)acrylic acid ester monomer, aromatic vinyl monomer and vinyl cyanide monomer, can also be used.

Examples of the vinyl monomer used for introducing hydroxyl groups as the functional groups into the modified vinyl-based polymer include vinyl monomers having a hydroxyl group such as 2-hydroxyethyl acrylate, 2-hydroxyethyl methacrylate, 3-hydroxypropyl acrylate, 3-hydroxypropyl methacrylate, 2,3,4,5,6-pentahydroxyhexyl acrylate, 2,3,4,5,6-pentahydroxyhexyl methacrylate, 2,3,4,5-tetrahydroxypentyl acrylate, 2,3,4,5-tetrahydroxypentyl methacrylate, 3-hydroxy-1-propene, 4-hydroxy-1-butene, cis-4-hydroxy-2-butene, trans-4-hydroxy-2-butene, 3-hydroxy-2-methyl-1-propene, cis-5-hydroxy-2-pentene, trans-5-hydroxy-2-pentene and 4-dihydroxy-2-butene.

Examples of the vinyl monomer used for introducing epoxy groups as the functional groups into the modified vinyl-based polymer include vinyl monomers having an epoxy group such as glycidyl acrylate, glycidyl methacrylate, glycidyl ethacrylate, glycidyl itaconate, allyl glycidyl ether, styrene-p-glycidyl ether and p-glycidylstyrene.

Examples of the vinyl monomer used for introducing amino groups as the functional groups into the modified vinyl-based polymer include vinyl monomers having an amino group or amide group such as acrylamide, methacrylamide, N-methylacrylamide, butoxymethylacrylamide, N-propylmethacrylamide, aminoethyl acrylate, propylaminoethyl acrylate, dimethylaminoethyl methacrylate, ethylaminopropyl methacrylate, phenylaminoethyl methacrylate, cyclohexylaminoethyl methacrylate, N-vinyldiethylamine, N-acetylvinylamine, allylamine, methallylamine, N-methylallylamine and p-aminostyrene.

Further, examples of the vinyl monomer used for introducing oxazoline groups as the functional groups include vinyl monomers having an oxazoline group such as 2-isopropenyl-oxazoline, 2-vinyl-oxazoline, 2-acroyl-oxazoline and 2-styryl-oxazoline.

As the modified vinyl-based polymer, a polymer with the intrinsic viscosity [η] in a range from 0.20 to 0.65 dl/g as measured in methyl ethyl ketone solvent at 30° C. is preferred, and a range from 0.35 to 0.60 dl/g is more preferred. Further, a polymer with the intrinsic viscosity [η] in a range from 0.30 to 0.90 dl/g as measured in N,N-dimethylformamide solvent at 30° C. is preferred, and a range from 0.40 to 0.75 dl/g is more preferred. If a modified vinyl-based polymer with the intrinsic viscosity in these ranges is used, the thermoplastic resin composition obtained has excellent impact resistance and moldability.

The organic ion conductive agent is an organic compound salt having ionic properties though it is an organic substance, and can also be an organic compound salt low in melting point and liquid at room temperature, called an ionic liquid or ion liquid. Many salts consisting of cations such as imidazolium, pyridinium, ammonium or phosphonium and anions containing fluorine such as fluoride ions and triflate are known.

As the organic ion conductive agent, an organic compound salt liquid at room temperature and called an ionic liquid such as imidazolium salt, pyridinium salt, ammonium salt or phosphonium salt is preferred. Particularly, organic compound salts represented by the following formulae (3) through (6) are preferred as the organic ion conductive agent:

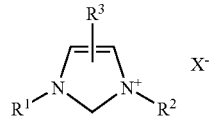

(3)

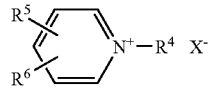

(4)

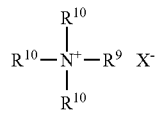

(5)

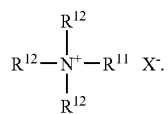

(6)

In the general Formulae (3) through (6), $R^1$ denotes an alkyl group with 1 to 5 carbon atoms; $R^2$ denotes an alkyl group with 1 to 8 carbon atoms or tridecafluorooctyl group; $R^3$ denotes a hydrogen atom or alkyl group with 1 to 5 carbon atoms; $R^4$ denotes an alkyl group with 1 to 5 carbon atoms; $R^5$ and $R^6$ denote, respectively independently, a hydrogen atom or alkyl group with 1 to 5 carbon atoms; $R^9$ and $R^{10}$ denote, respectively independently, an alkyl group with 1 to 5 carbon atoms; and $R^9$ and $R^{12}$ denote, respectively independently, an alkyl group with 1 to 15 carbon atoms. Further, the X constituting the anion component $[X]^-$ in these formulae denotes $(CF_3SO_2)_2N$, $(C_2F_5SO_2)_2N$, $(CF_3SO_2)_3C$, $CF_3SO_3$, I, Br, Cl, $PF_6$, $BF_4$, $NO_3$, $CH_3SO_4$, p-$CH_3C_6H_4SO_3$ (tosyl), $CH_3O(C_2H_4O)_2SO_3$, $C_8H_{17}SO_3$, SCN, $CH_3SO_3$, $CH_3(CH_2)_8CO_2$, $N(CN)_2$, $CF_3(CF_2)_7SO_3$, $CF_3(CF_2)_3SO_3$, $[(CH_3)_3CCH_2CH(CH_3)CH_2]_2PO$ or $AlCl_4$.

More particularly, examples of the organic ion conductive agent as the imidazolium salt include 1,3-dimethylimidazolium.methylsulfate, 1-ethyl-3-methylimidazolium.bis(pentafluoroethylsulfonyl)imide, 1-ethyl-3-methylimidazolium.bis(trifluoroethylsulfonyl)imide, 1-ethyl-3-methylimidazolium.bromide, 1-ethyl-3-methylimidazolium.chloride, 1-ethyl-3-methylimidazolium.nitrate, 1-ethyl-3-methylimidazolium.hexafluorophosphate, 1-ethyl-3-methylimidazolium.tetrafluoroborate, 1-ethyl-3-methylimidazolium.tosylate, 1-ethyl-3-methylimidazolium.trifluoromethanesulfonate, 1-n-butyl-3-methylimidazolium.trifluoromethanesulfonate, 1-butyl-3-methylimidazolium.bis(trifluoromethylsulfonyl)imide, 1-butyl-3-methylimidazolium.bromide, 1-butyl-3-methylimidazolium.chloride, 1-butyl-3-methylimidazolium.hexafluorophosphate, 1-butyl-3-methyl imidazolium.2-(2-methoxyethoxy)ethylsulfate, 1-butyl-3-methylimidazolium.methylsulfate, 1-butyl-3-methylimidazolium.tetrafluoroborate, 1-hexyl-3-methylimidazolium.chloride, 1-hexyl-3-methylimidazolium.hexafluorophosphate, 1-hexyl-3- methylimidazoium.tetrafluoroborate, 1-methyl-3-octylimidazolium.chloride, 1-methyl-3-octylimidazolium.tetrafluoroborate, 1,2-dimethyl-3-propyloctylimidazolium.tris(trifluoromethylsulfonyl)methide, 1-butyl-2,3-dimethylimidazolium.chloride, 1-butyl-2,3-dimethylimidazolium.hexafluorophosphate, 1-butyl-2,3-dimethylimidazolium.tetrafluoroborate, 1-methyl-3-(3,3,4,4,5,5,6,6,7,7,8,8-tridecafluorooctyl)imidazolium.hexafluorophosphate, 1-butyl-3-(3,3,4,4,5,5,6,6,7,7,8,8-tridecafluorooctyl)imidazolium.hexafluorophosphate, etc.

Examples of the organic ion conductive agent as the pyridinium salt include 3-methyl-1-propylpyridinium.bis(trifluoromethylsulfonyl)imide, 1-butyl-3-methylpyridinium.bis(trifluoromethylsulfonyl)imide, 1-propyl-3-methylpyridinium.trifluoromethanesulfonate, 1-butyl-3-methylpyridinium.trifluoromethanesulfonate, 1-butyl-4-methylpyridinium.bromide, 1-butyl-4-methylpyridinium.chloride, 1-butyl-4-methylpyridinium.hexafluorophosphate, 1-butyl-4-methylpyridinium.tetrafluoroborate, etc.

Examples of the organic ion conductive agent as the ammonium salt include tetrabutylammonium.heptadecafluorooctanesulfonate, tetrabutylammonium nonafluorobutanesulfonate, tetrapentylammonium.methanesulfonate, tetrapentylammonium.thiocyanate, methyl-tri-n-butylammonium.methylsulfate, etc.

Examples of the organic ion conductive agent as the phosphonium salt include tetrabutylphosphonium.methanesulfonate, tetrabutylphosphonium.p-toluenesulfonate, trihexyltetradecylphosphonium.bis(trifluoroethylsulfonyl)imide, trihexyltetradecylphosphonium.bis(2,4,4-trimethylpentyl)phosphinate, trihexyltetradecylphosphonium.bromide, trihexyltetradecylphosphonium.chloride, trihexyltetradecylphosphonium.decanoate, trihexyltetradecylphosphonium.hexafluorophosphinate, triethyltetradecylphosphonium.tetrafluoroborate, tributylmethylphosphonium.tosylate, etc.

Among these organic ion conductive agents, imidazolium salts and pyridinium salts are suitable, and among them, imidazolium salts and pyridinium salts represented by the following Formulae (1) and (2) can be preferably used:

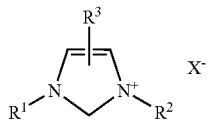

(1)

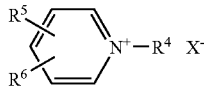

(2)

{in the general Formulae (1) and (2), $R^1$, $R^2$ and $R^4$ denote, respectively independently, an alkyl group with 1 to 5 carbon atoms; $R^3$, $R^5$ and $R^6$ denote, respectively independently, a hydrogen atom or alkyl group with 1 to 5 carbon atoms; and X denotes $(CF_3SO_2)_2N$, $(C_2F_5SO_2)_2N$, $(CF_3SO_2)_3C$ or $CF_3SO_3$}.

In the general Formulae (1) and (2), it is preferred in view of the thermal stability of the antistatic thermoplastic resin composition of this invention that the X constituting an anion component denotes a group having a fluoro group, and $CF_3SO_3$ (trifluoromethanesulfonate) or $(CF_3SO_2)_2N$ (bis(trifluoromethanesulfonyl)imide) can be more preferably used.

The added amount of the organic ion conductive agent is 0.01 to 20 parts by weight per 100 parts by weight of the thermoplastic resin composition consisting of the styrene-based resin and the copolymer containing alkylene oxide units as a component. It is preferred that the added amount of the organic ion conductive agent is 0.05 to 10 parts by weight, and a more preferred range is 0.1 to 5 parts by weight. If the added amount of the organic ion conductive agent is less than 0.01 part by weight, the antistatic property of the antistatic thermoplastic resin composition declines and, if it is more than 20 parts by weight, the heat resistance tends to decline. Also in view of cost, it is preferred that the added amount is in the range.

A commercially available organic ion conductive agent can be used as it is. Further, can be used an organic ion conductive agent produced by a publicly known method, for example, by a method of quaternarizing a tertiary amine by an alkyl halide and subsequently performing an anion exchange reaction using a salt having an intended anion component.

Any of various thermoplastic resins can also be mixed with the antistatic thermoplastic resin composition to such an extent that the object is not impaired. For example, if a polyolefin resin such as polyethylene or polypropylene, a polyester resin such as polyethylene terephthalate or polybutylene terephthalate, a polyamide resin such as nylon 6 or nylon 6,6, modified PPE resin, polycarbonate resin, polyacetal resin, or any of their modified products and elastomers is mixed, the resin composition to be molded can be further enhanced in performance.

Further, the antistatic thermoplastic resin composition can further contain, as required, an antioxidant such as hindered phenol-based antioxidant, sulfur-containing compound-based antioxidant or phosphorus-containing organic compound-based antioxidant, thermostabilizer such as phenol-based thermostabilizer or acrylate-based thermostabilizer, ultraviolet light absorber such as benzotriazole-based absorber, benzophenone-based absorber or salicylate-based absorber, photostabilizer such as organic nickel-based photostabilizer or hindered amine-based photostabilizer, lubricant such as a metal salt of a higher fatty acid or higher fatty acid amide, plasticizer such as a phthalic acid ester or phosphoric acid ester, any of various flame retardants such as a brominated compound, phosphoric acid ester or red phosphorus, flame retardant aid such as antimony trioxide or antimony pentoxide, a metal salt of an alkylcarboxylic acid or alkylsulfonic acid, carbon black, pigment, dye, etc. Further, any of various reinforcing materials, filler, or neutralizing agent in the case where any component is acidic or basic, etc. can be added.

The antistatic thermoplastic resin composition can be molded into a molded article by any publicly known molding method presently used for molding thermoplastic resins such as injection molding, extrusion molding, blow molding, vacuum molding, compression molding or gas-assist molding, etc.

The molded articles formed of the antistatic thermoplastic resin composition are low in surface resistivity value, stable in sustained antistatic property and excellent in moldability, surface appearance and mechanical properties. Since the molded articles have such properties, they can be suitably used as electric and electronic parts, carrier parts for electric and electronic parts, and carrier parts for display related parts.

Parts of electric and electronic apparatuses include, for example, parts of various apparatuses equipped with precise electric and electronic control devices, electric equipment parts for automobiles such as car navigation systems, car audio systems and peripheral apparatuses of fuel cells mounted on electric motor vehicles, peripheral IC parts and housings of industrial and household IC-mounted electronic toys, industrial and household digital electronic apparatus parts, industrial game and amusement apparatuses such as slot machines, pachinko machines and electronic game machines, etc. Carrier parts for electric and electronic parts include IC chip trays, IC carrier trays, silicon wafer carrier boxes, etc. Carrier parts for display related parts include carrier reels, TAB tape reels, COF tape reels, liquid crystal display carrier trays, plasma display carrier trays, etc.

EXAMPLES

Examples are described below, but this disclosure is not limited thereto or thereby. In the following working examples and comparative examples, "parts" means "parts by weight" and "%" means "wt %" unless otherwise stated.

At first, the methods for evaluating the respective physical properties of antistatic thermoplastic resin compositions are described below.

(1) Charpy Impact Strength

According to ISO 179 (1993), Charpy impact strength was measured using specimens of 80×10×4 mm with type A notch at a temperature of 23° C. Five specimens were used.

(2) Flexural Modulus

According to ISO 178 (1993), the flexural modulus was evaluated. Five specimens were used.

(3) Melt Flow Rate

According to ISO 1133 (1997) (temperature 220° C., load 98N), the melt flow rate was evaluated. The test was performed 3 times.

(4) Surface Resistivity Value

A molded rectangular plate of 40×50×3 mm (thickness) obtained by injection molding using PS60E Molding Machine produced by Nissei Plastic industrial Co., Ltd. and set at a cylinder temperature of 230° C. and a mold temperature of 60° C. was allowed to stand under an environment of 23° C. temperature and 50% relative humidity for 24 hours, and the surface resistivity value was measured according to ASTM D257 (1990).

At an applied voltage of 500 V, the surface resistivity value was read one minute later. In the case where the surface resistivity value was $5×10^8 \Omega$ or less, since the measurement under the abovementioned conditions was difficult, 3452MQHi TESTER produced by Hioki E.E. Corp. was used for measurement. Three specimens were used.

(5) Electrostatic Voltage and Electrostatic Voltage Attenuation Half Life (Static Electricity Dissipation Performance)

The electrostatic voltage and the electrostatic voltage attenuation half life of the molded rectangular plate obtained in the abovementioned (4) were measured using Static Honest Meter (produced by Shishido). With the distance between the molded plate and an application electrode set at 15 mm and the distance between the molded plate and a detection electrode set at 10 mm, a voltage of 8 kV was applied for one minute, and the electrostatic voltage was read. For measuring the electrostatic voltage attenuation half life, the voltage application was stopped, and the time taken till the electrostatic voltage was halved was read. Three specimens were used. A lower electrostatic voltage and a shorter electrostatic voltage attenuation half life mean more excellent static electricity dissipation performance. The maximum electrostatic voltage that can be measured by the instrument is 2,900 V.

(6) Total Light Transmittance and Haze

The total light transmittance (%) and the haze (%) of the molded rectangular plate obtained in the abovementioned (4) were measured according to JIS K 7105 (1981) using the Direct Reading Haze Meter produced by Toyo Seiki Seisaku-Sho, Ltd. Three specimens were used.

Reference Example 1

Production of Styrene-Based Resins (A-1) to (A-4)

The grafting rate of each graft copolymer was obtained by the following method. Acetone was added to a predetermined amount (m) of the graft copolymer and the solution was refluxed for 4 hours. The solution was rotated at 8,000 rpm {centrifugal force 10,000 G (about $100×10^3$ m/s$^2$)} for 30 minutes for centrifugation, to obtain an insoluble matter as the residue. The insoluble matter was dried under reduced pressure at a temperature of 70° C. for 5 hours and weighed (n). The grafting rate was obtained from the following formula:

$$\text{Grafting rate} = [(n)-(m)×L]/[(m)×L]×100$$

where L is the rubber content of the graft copolymer.

Production of Graft Copolymer (A-1)

Forty parts of a monomer mixture consisting of 70% of styrene and 30% of acrylonitrile were added to 60 parts (as solid) of polybutadiene latex (average rubber particle size 0.3 µm, gel content 85%), and the mixture was emulsion-polymerized. The obtained graft copolymer was solidified by sulfuric acid, neutralized by sodium hydroxide, washed, and filtered. The residue was dried to obtain a powdery graft copolymer (A-1).

The grafting rate of the obtained graft copolymer (A-1) was 36%. The graft copolymer (A-1) contained 18.1% of a non-graft copolymer consisting of 70% of styrene structural units and 30% of acrylonitrile structural units. Further, the intrinsic viscosity of the N,N-dimethylformamide soluble matter was 0.48 dl/g.

Production of Graft Copolymer (A-2)

Fifty parts of a monomer mixture consisting of 70% of methyl methacrylate, 25% of styrene and 5% of acrylonitrile were added to 50 parts (as solid) of polybutadiene latex (average rubber particle size 0.2 µm), and the mixture was emulsion-polymerized. The obtained graft copolymer was solidified by sulfuric acid, neutralized by sodium hydroxide, washed, and filtered, and the residue was dried to obtain a powdery graft copolymer (A-2). The grafting rate of the obtained graft copolymer (A-2) was 45%. The intrinsic viscosity of the methyl ethyl ketone soluble matter was 0.32 dl/g.

Production of Vinyl-Based Copolymer (A-3)

A monomer mixture consisting of 70% of styrene and 30% of acrylonitrile was suspension-polymerized to obtain a vinyl-based copolymer (A-3). The intrinsic viscosity of the N,N-dimethylformamide soluble matter of the obtained vinyl-based copolymer (A-3) was 0.73 dl/g.

Production of Vinyl-Based Copolymer (A-4)

A monomer mixture consisting of 70% of methyl methacrylate, 25% of styrene and 5% of acrylonitrile was suspension-polymerized to obtain a vinyl-based copolymer (A-4). The intrinsic viscosity of the N,N-dimethylformamide soluble matter of the obtained vinyl-based copolymer (A-4) was 0.42 dl/g.

Reference Example 2

Production of Copolymers Containing Alkylene Oxide Units as a Component, (B-1) to (B-3)

Production of Polyether-Ester Amide (B-1)

Forty five parts of ε-caprolactam, 45 parts of ethylene oxide addition product of bisphenol A with a number average molecular weight of 1,800, 5 parts of polyethylene glycol with a number average molecular weight of 1,800, 5.2 parts of terephthalic acid and 0.2 part of "Irganox" (registered trademark) 1098 (antioxidant) were supplied into a reaction vessel and, after purging with nitrogen, the mixture was heated and stirred at a temperature of 260° C. for 60 minutes, to obtain a transparent homogeneous solution, followed by decompression to 0.07 kPa. Zero point one part of tetrabutyl titanate was added, and a reaction was performed at a pressure of 0.07 kPa or less and at a temperature of 260° C. for 2 hours. The obtained polymer was discharged as a strand that was cut to obtain a polyamide elastomer (B-1) as pellets.

Production of Polyether-Ester (B-2)

Eighty four parts of polyethylene oxide glycol with a number average molecular weight of 1,000, 100 parts of terephthalic acid, 98 parts of 1,4-butanediol, 0.03 part of "Irganox" (registered trademark) 1010 (antioxidant), 0.05 part of mono-n-butyl tin oxide and 0.06 part of tetra-n-butyl titanate were supplied into a reaction vessel and, after purging with nitrogen, the mixture was heated stepwise from 100° C. to 225° C., while water was removed with continued stirring, taking 220 minutes. Then, the residue was heated to 250° C., and 0.02 part of phosphoric acid and 0.06 part of tetra-n-butyl titanate were added. A reaction was performed for 2 hours at a reduced pressure of 1 mm Hg or less while 1,4-butanediol, etc. were distilled away. The obtained polymer was discharged as a strand that was cut to obtain a polyether-ester (B-2) as pellets. The melting point measured by DSC was 194° C. (heating rate 20° C./min in nitrogen stream).

Production of Polyether-Ester (B-3)

A reaction was performed as in the case of the polyether-ester (B-2), except that polyethylene oxide glycol with a number average molecular weight of 2,000 was used. The obtained polymer was discharged as a strand that was cut to obtain a polyether-ester (B-3) as pellets. The melting point measured by DSC was 208° C. (heating rate 20°/min in nitrogen steam).

Reference Example 3

Organic ion Conductive Agents (C-1) and (C-2)

Organic Ion Conductive Agent (C-1)

As organic ion conductive agent (C-1), 1-butyl-3-methylpyridinium.bis(trifluoromethanesulfonyl)imide (produced by Japan Carlit Co., Ltd.) was used.

Organic Ion Conductive Agent (C-2)

As organic ion conductive agent (C-2), 1-butyl-3-methylpyridinium.trifluoromethanesulfonate (produced by Japan Carlit Co., Ltd.) was used.

Reference Example 4

Modified Vinyl-Based Copolymer (D-1)

Modified Vinyl-Based Copolymer (D-1)

Seventy one parts of styrene, 28 parts of acrylonitrile and 1 part of glycidyl methacrylate were suspension-polymerized to obtain a modified vinyl-based copolymer (D-1) as beads. The intrinsic viscosity of the obtained modified vinyl-based copolymer (D-1) measured in methyl ethyl ketone at 30° C. and 0.4% concentration was 0.56.

Working Examples 1 to 20 and Comparative Examples 1 to 7

The styrene-based resins (A-1) through (A-4), the copolymers containing alkylene oxide units as a component (B-1) through (B-3), the organic ion conductive agents (C-1) and (C-2), and the modified vinyl-based copolymer (D-1) were mixed at the mixing ratios shown in Tables 1 through 4, and the respective mixtures were melt-kneaded (barrel temperature set at 230° C.) and extruded using a vented 30 mm double screw extruder (PCM-30 produced by Ikegai Ltd.), to produce thermoplastic resin compositions as pellets. Then, an injection molding machine was used to produce specimens composed of the abovementioned thermoplastic resin compositions at a cylinder temperature of 230° C. and at a mold temperature of 60° C. The physical properties of the specimens were measured under the abovementioned conditions, and the results are shown together in Tables 1 through 4.

TABLE 1

| Thermoplastic resin composition | | Working Example 1 | Working Example 2 | Working Example 3 | Working Example 4 | Working Example 5 | Working Example 6 | Working Example 7 |
|---|---|---|---|---|---|---|---|---|
| Mixing ratio | Graft copolymer (A-1) (parts) | 20 | 20 | 12 | 14 | 20 | 17 | 20 |
| | Graft copolymer (A-2) (parts | — | — | — | — | — | — | — |
| | Vinyl-based copolymer (A-3) (parts) | 55 | 55 | 63 | 63 | 55 | 63 | 55 |
| | Vinyl-based copolymer (A-4) (parts) | — | — | — | — | — | — | — |
| | Polyether-ester amide (B-1) (parts) | 25 | 25 | 25 | 23 | 25 | 20 | 25 |
| | Polyether-ester (B-2) (parts) | — | — | — | — | — | — | — |
| | Polyether-ester (B-3) (parts) | — | — | — | — | — | — | — |
| | Organic ion conductive agent (C-1) (parts) | 0.5 | — | — | — | 2.0 | — | — |
| | Organic ion conductive agent (C-2) (parts) | — | 0.5 | 1 | 1.5 | — | 2.0 | 2.0 |
| | Modified vinyl-based copolymer (D-1) (parts) | — | — | — | — | — | — | — |

TABLE 1-continued

| Thermoplastic resin composition | | Working Example 1 | Working Example 2 | Working Example 3 | Working Example 4 | Working Example 5 | Working Example 6 | Working Example 7 |
|---|---|---|---|---|---|---|---|---|
| Physical properties | Charpy impact strength (KJ/m$^2$) | 18 | 18 | 10 | 11 | 18 | 8 | 17 |
| | Flexural modulus (MPa) | 1690 | 1650 | 1780 | 1750 | 1610 | 1830 | 1630 |
| | Melt flow rate (g/10 min) | 28 | 27 | 35 | 33 | 30 | 29 | 32 |
| | Surface resistivity value (Ω) | $9 \times 10^8$ | $3 \times 10^8$ | $3 \times 10^7$ | $4 \times 10^7$ | $1 \times 10^7$ | $5 \times 10^8$ | $1 \times 10^7$ |
| | Electrostatic voltage (V) | 140 | 130 | 117 | 90 | 90 | 80 | 78 |
| | Electrostatic voltage attenuation half life (sec) | 0.3 | 0.3 | 0.3 | 0.2 | 0.2 | 0.2 | 0.2 |
| | Total light transmittance (%) | — | — | — | — | — | — | — |
| | Haze (%) | — | — | — | — | — | — | — |

TABLE 2

| Thermoplastic resin composition | | Working Example 8 | Working Example 9 | Working Example 10 | Working Example 11 | Working Example 12 | Working Example 13 | Working Example 14 |
|---|---|---|---|---|---|---|---|---|
| Mixing ratio | Graft copolymer (A-1) (parts) | 20 | 20 | — | — | — | — | — |
| | Graft copolymer (A-2) (parts) | — | — | 25 | 16 | 14 | 12 | 25 |
| | Vinyl-based copolymer (A-3) (parts) | 55 | 55 | — | — | — | — | — |
| | Vinyl-based copolymer (A-4) (parts) | — | — | 50 | 59 | 63 | 67 | 50 |
| | Polyether-ester amide (B-1) (parts) | 25 | 25 | 25 | 25 | 23 | 21 | 25 |
| | Polyether-ester (B-2) (parts) | — | — | — | — | — | — | — |
| | Polyether-ester (B-3) (parts) | — | — | — | — | — | — | — |
| | Organic ion conductive agent (C-1) (parts) | 5.0 | — | — | — | — | — | — |
| | Organic ion conductive agent (C-2) (parts) | — | 5.0 | 0.5 | 1.5 | 1.5 | 1.5 | 2.0 |
| | Modified vinyl-based copolymer (D-1) (parts) | — | — | — | — | — | — | — |
| Physical properties | Charpy impact strength (KJ/m$^2$) | 18 | 16 | 17 | 12 | 9 | 8 | 17 |
| | Flexural modulus (MPa) | 1580 | 1600 | 1200 | 1460 | 1580 | 1760 | 1120 |
| | Melt flow rate (g/10 min) | 32 | 38 | 29 | 41 | 41 | 43 | 34 |
| | Surface resistivity value (Ω) | $7 \times 10^6$ | $7 \times 10^6$ | $1 \times 10^8$ | $3 \times 10^7$ | $3 \times 10^7$ | $6 \times 10^7$ | $7 \times 10^6$ |
| | Electrostatic voltage (V) | 70 | 70 | 110 | 60 | 67 | 71 | 50 |
| | Electrostatic voltage attenuation half life (sec) | 0.2 | 0.2 | 0.3 | 0.2 | 0.2 | 0.2 | 0.1 |
| | Total light transmittance (%) | — | — | 76 | 73 | 74 | 76 | 75 |
| | Haze (%) | — | — | 14 | 14 | 12 | 11 | 15 |

TABLE 3

| Thermoplastic resin composition | | Working Example 15 | Working Example 16 | Working Example 17 | Working Example 18 | Working Example 19 | Working Example 20 |
|---|---|---|---|---|---|---|---|
| Mixing ratio | Graft copolymer (A-1) (parts) | 17 | 17 | 17 | 17 | — | — |
| | Graft copolymer (A-2) (parts) | — | — | — | — | 17 | 17 |
| | Vinyl-based copolymer (A-3) (parts) | 44 | 44 | 44 | 44 | — | — |

TABLE 3-continued

| | Thermoplastic resin composition | Working Example 15 | Working Example 16 | Working Example 17 | Working Example 18 | Working Example 19 | Working Example 20 |
|---|---|---|---|---|---|---|---|
| | Vinyl-based copolymer (A-4) (parts) | — | — | — | — | 44 | 44 |
| | Polyether-ester amide (B-1) (parts) | — | — | — | — | — | — |
| | Polyether-ester (B-2) (parts) | 39 | — | 39 | — | 39 | — |
| | Polyether-ester (B-3) (parts) | — | 39 | — | 39 | — | 39 |
| | Organic ion conductive agent (C-1) (parts) | 2.0 | 2.0 | — | — | — | — |
| | Organic ion conductive agent (C-2) (parts) | — | — | 2.0 | 2.0 | 2.0 | 2.0 |
| | Modified vinyl-based copolymer (D-1) (parts) | 10 | 10 | 10 | 10 | 10 | 10 |
| Physical properties | Charpy impact strength (KJ/m$^2$) | 19 | 19 | 19 | 19 | 12 | 12 |
| | Flexural modulus (MPa) | 1500 | 1500 | 1500 | 1500 | 1450 | 1450 |
| | Melt flow rate (g/10 min) | 40 | 38 | 40 | 38 | 43 | 40 |
| | Surface resistivity value (Ω) | $1 \times 10^8$ | $1 \times 10^8$ | $1 \times 10^8$ | $1 \times 10^8$ | $8 \times 10^7$ | $8 \times 10^7$ |
| | Electrostatic voltage (V) | 120 | 120 | 120 | 120 | 100 | 100 |
| | Electrostatic voltage attenuation half life (sec) | 0.3 | 0.3 | 0.3 | 0.3 | 0.3 | 0.3 |
| | Total light transmittance (%) | — | — | — | — | — | — |
| | Haze (%) | — | — | — | — | — | — |

TABLE 4

| | Thermoplastic resin composition | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Mixing ratio | Graft copolymer (A-1) (parts) | 20 | 20 | 20 | 20 | 20 | 17 | 17 |
| | Graft copolymer (A-2) (parts) | — | — | — | — | — | — | — |
| | Vinyl-based copolymer (A-3) (parts) | 55 | 80 | 55 | 80 | 55 | 44 | 44 |
| | Vinyl-based copolymer (A-4) (parts) | — | — | — | — | — | — | — |
| | Polyether-ester amide (B-1) (parts) | 25 | — | 25 | — | 25 | — | — |
| | Polyether-ester (B-2) (parts) | — | — | — | — | — | 39 | 39 |
| | Polyether-ester (B-3) (parts) | — | — | — | — | — | — | — |
| | Organic ion conductive agent (C-1) (parts) | — | 2.0 | 23.0 | — | — | — | — |
| | Organic ion conductive agent (C-2) (parts) | — | — | — | 2.0 | 23.0 | — | 23.0 |
| | Modified vinyl-based copolymer (D-1) (parts) | — | — | — | — | — | 10 | 10 |
| Physical properties | Charpy impact strength (KJ/m$^2$) | 18 | 8 | — | 7 | — | 19 | — |
| | Flexural modulus (MPa) | 1660 | 2600 | — | 2620 | — | 1500 | — |
| | Melt flow rate (g/10 min) | 26 | 18 | — | 18 | — | 38 | — |
| | Surface resistivity value (Ω) | $7 \times 10^{10}$ | $>10^{16}$ | — | $>10^{16}$ | — | $9 \times 10^{16}$ | — |
| | Electrostatic voltage (V) | 1360 | * | — | * | — | 1460 | — |

| Thermoplastic resin composition | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| | Electrostatic voltage attenuation half life (sec) | 0.7 | * | — | * | — | 0.8 | — |
| | Total light transmittance (%) | — | — | — | — | — | — | — |
| | Haze (%) | — | — | — | — | — | — | — |

As shown in Tables 1 through 3, all the antistatic thermoplastic resin compositions (Working Examples 1 through 20) were excellent in surface resistivity value, electrostatic voltage and electrostatic voltage attenuation half life and also excellent in mechanical properties and moldability.

On the other hand, as shown in Table 4, the thermoplastic resin compositions containing less than 0.01 part by weight of (not containing) an organic ion conductive agent (Comparative Examples 1 and 6) were high in surface resistivity value and electrostatic voltage. Further, the thermoplastic resin compositions containing more than 20 parts by weight of an organic ion conductive agent (Comparative Examples 3, 5 and 7) had a problem in extrusion property and could not be granulated. The thermoplastic resin compositions containing 3 part by weight or less of (not containing) a copolymer containing alkylene oxide units as a component (Comparative Examples 2 and 4) were high in surface resistivity value and did not allow the electrostatic voltage or the electrostatic voltage attenuation half life to be measured (marked by * in Table 4).

INDUSTRIAL APPLICABILITY

The thermoplastic resin composition is low in surface resistivity value, stable in sustained antistatic property and excellent in moldability, surface appearance and mechanical properties. Therefore, the thermoplastic resin composition has an excellent surface resistivity value as a property that could not be achieved in the conventional thermoplastic resin compositions, and can be suitably used as molded articles such as electric and electronic parts, carrier parts for electric and electronic parts, carrier parts for display related parts, especially as molded articles such as IC carrier cases and IC trays sensitive to metal salts and electronic and electric apparatus parts sensitive to static electricity.

The invention claimed is:

1. An antistatic thermoplastic resin composition comprising 0.1 to 20 parts by weight of an organic ion conductive agent mixed with 100 parts by weight of a thermoplastic resin composition consisting of 97 to 55 parts by weight of a styrene-based resin and 3 to 45 parts by weight of a copolymer containing alkylene oxide units as a component, and having a low surface resistivity of no more than $9 \times 10^8 \Omega$.

2. The antistatic thermoplastic resin composition, according to claim 1, wherein the organic ion conductive agent is an imidazolium salt, pyridinium salt, ammonium salt or phosphonium salt.

3. The antistatic thermoplastic resin composition, according to claim 1, wherein the organic ion conductive agent is any of the compounds represented by the following general Formula (1) or (2):

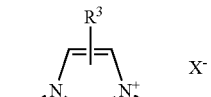

(1)

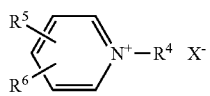

(2)

(where $R^1$, $R^2$ and $R^4$ denote, respectively independently, an alkyl group with 1 to 5, carbon atoms; $R^3$, $R^5$ and $R^6$ denote; respectively independently, a hydrogen atom or alkyl group with 1 to 5 carbon atoms; X denotes $(CF_3SO_2)_2N$, $(C_2F_5SO_2)_2N$, $(CF_3SO_2)_3C$ or $CF_3SO_3$).

4. The antistatic, thermoplastic resin composition, according to claim 3, wherein the organic ion conductive agent is a compound represented by the general formula (1) or (2) where X denotes $CF_3SO_3$ or $(CF_3SO_2)_2N$.

5. The antistatic thermoplastic resin composition, according to claim 1, wherein the organic ion conductive agent is 1-butyl-3-methylpyridinium.trifluoromethanesulfonate or 1-butyl-3-methylpyridinium.bis(trifluoromethanesulfonyl) imide.

6. The antistatic thermoplastic resin composition, according to claim 1, wherein the copolymer containing alkylene oxide units as a component is a polyether-ester amide or polyether-ester.

7. The antistatic thermoplastic resin composition, according to claim 1, wherein the copolymer containing alkylene oxide units as acomponent is a copolymer containing one or more diol compounds selected from the group consisting of poly(alkylene oxide) glycols with a number average molecular weight of 200 to 6,000 and the following Formulae (I) through (III) with a number average molecular weight of 1,000 to 3,000 as a component(s):

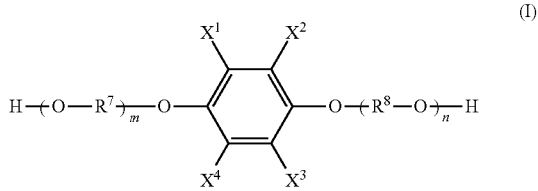

(I)

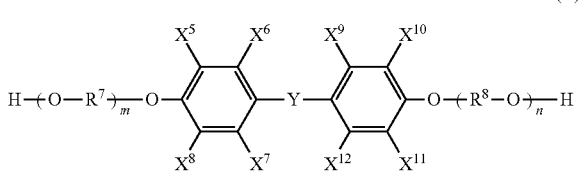

(II)

-continued

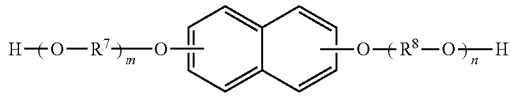

(III)

(where $R^7$ and $R^8$ denote, respectively independently, an ethylene group or propylene group; Y denotes a covalent bond, alkylene group with 1 to 6 carbon atoms, alkylidene group with 2 to 6 carbon atoms, cycloalkylidene group with 7 to 17 carbon atoms, arylalkylidene group with 7 to 17 carbon atoms, O, SO, $SO_2$, CO, S, $CF_2$, $C(CF_3)_2$ or NH; $X^1$ to $X^{12}$ denote, respectively independently, hydrogen atom, alkyl group with 1 to 6 carbon atoms, halogen, $SO_3H$ or any of its metal salts; and m and n respectively denote a polymerization degree as a component.

8. The antistatic thermoplastic resin composition, according to claim 1, wherein the copolymer containing alkylene oxide units as a component is a copolymer containing polyethylene oxide glycol with a number average molecular weight of 200 to 6,000 as a component.

9. The antistatic thermoplastic resin composition, according to claim 1, wherein the copolymer containing alkylene oxide units as a component is a copolymer containing an aminocarboxylic acid with 6 or more carbon atoms, lactam with 6 or more carbon atoms, or a reaction product obtained from a diamine with 6 or more carbon atoms and a dicarboxylic acid with 6 or more carbon atoms as a component.

10. The antistatic thermoplastic resin composition, according to claim 1, wherein the styrene-based resin contains a vinyl-based copolymer obtained by copolymerizing an aromatic vinyl monomer and another vinyl monomer copolymerizable with said aromatic vinyl monomer.

11. The antistatic thermoplastic resin composition, according to claim 1, wherein the styrene-based resin contains a graft copolymer obtained by graft-polymerizing an aromatic vinyl monomer and another vinyl monomer copolymerizable with said aromatic vinyl monomer to a rubbery polymer.

12. The antistatic thermoplastic resin composition, according to claim 1 wherein the styrene-based resin contains a vinyl-based copolymer obtained by copolymerizing an aromatic vinyl monomer and another vinyl monomer copolymerizable with said aromatic vinyl monomer, and a graft copolymer obtained by graft-polymerizing an aromatic vinyl monomer and another vinyl monomer copolymerizable with said aromatic vinyl monomer to a rubbery polymer.

13. A molded article composed of the antistatic thermoplastic resin composition as set forth in any one of claims 1 through 12.

* * * * *